Feb. 12, 1952    W. L. SPIELMAN    2,585,870
RELEASE MECHANISM
Filed March 26, 1945
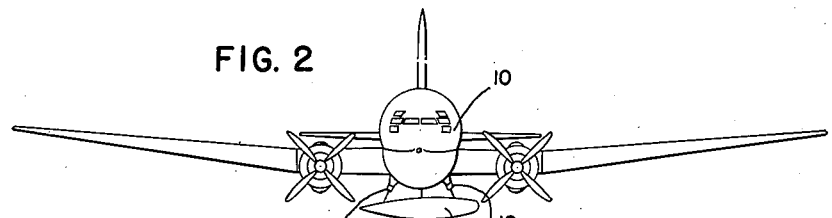
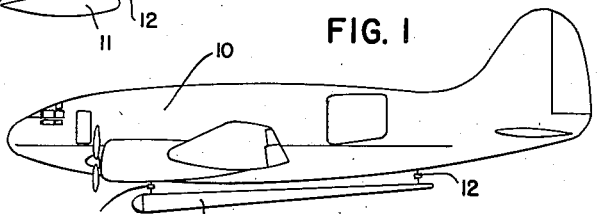
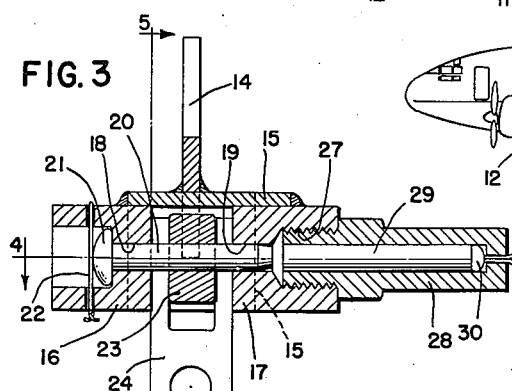
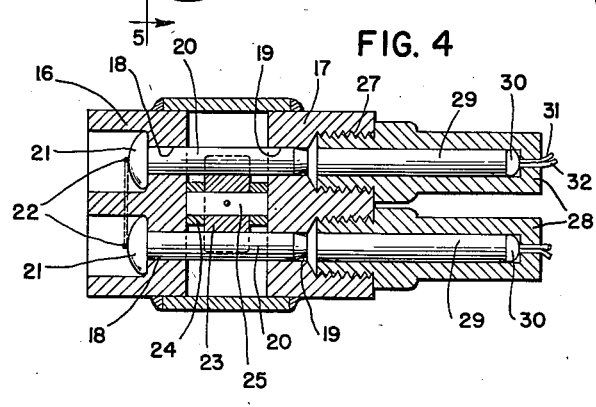
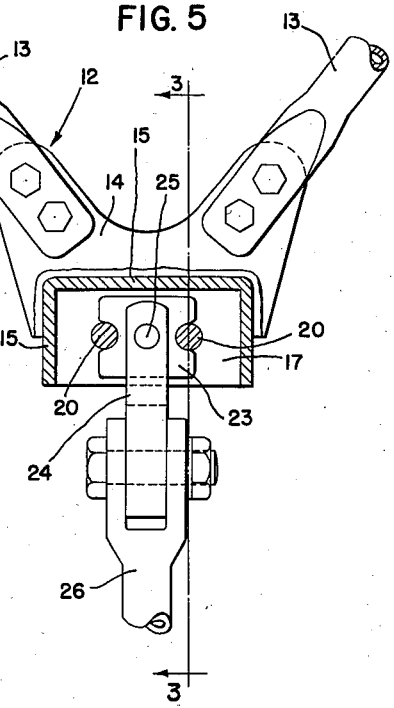
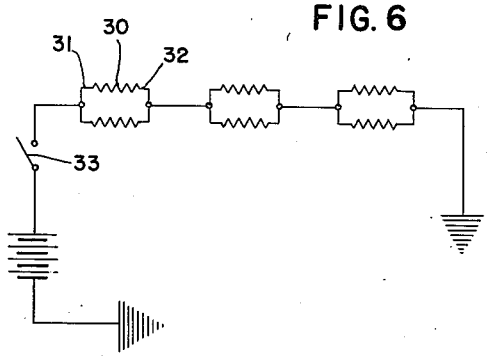
INVENTOR.
WARREN L. SPIELMAN
BY George F. Goodyear
ATTORNEY Patented Feb. 12, 1952

2,585,870

UNITED STATES PATENT OFFICE 2,585,870

RELEASE MECHANISM

Warren L. Spielman, Louisville, Ky., assignor to Curtiss-Wright Corporation, a corporation of Delaware Application March 26, 1945, Serial No. 584,945

4 Claims. (Cl. 89—1.5)

This invention relates generally to release mechanisms, and more particularly to release mechanisms for releasing objects from an aircraft.

In the transportation of equipment by air, the equipment so transported is often of such great size that it is impossible to carry it in the interior of the aircraft. Under such circumstances, the equipment may be carried underneath the fuselage or other convenient location on the aircraft. When this is done, it is desired to provide mechanism for jettisoning the equipment so carried, in case an emergency should arise, such as adverse weather conditions, faulty operation of the transporting aircraft, or attack by enemy aircraft. Since objects so carried are ordinarily quite bulky, they are usually suspended from two or more widely spaced points on the aircraft. In jettisoning the objects, it is obviously important to effect simultaneous release from all the suspension points, in order to avoid injury to the transport aircraft or the personnel therein.

It is therefore an object of this invention to provide a release mechanism, particularly useful for releasing objects from aircraft. It is another object to provide such a release mechanism which will act positively and simultaneously at a number of spaced points. It is another object to provide such a mechanism which will act by means of an explosive charge. Other objects will appear hereinafter.

These objects are accomplished by the herein described invention, which may be more readily understood by reference to the accompanying drawings, in which: Figure 1 is a side view of an airplane carrying an emergency or spare wing underneath its fuselage; Figure 2 is a front view of the arrangement in Figure 1; Figure 3 is an enlarged detailed cross section of the release mechanism taken along the line 3—3 of Figure 5; Figure 4 is a section taken along the line 4—4 of Figure 3; Figure 5 is a section taken along the line 5—5 of Figure 3. Figure 6 is a schematic drawing of the firing circuit.

An important feature of this invention is that an explosive charge ejects a pin holding in place a member to which the suspended object is attached. In the preferred form of the invention as described herein, a set of two or more pins and two or more explosive charges is used at each suspension point, thus providing an additional safety feature. In the case of the failure of one of the charges the other pin will still release the object, as will be apparent hereinafter.

Referring now to Figures 1 and 2 of the drawings, an airplane having the customary fuselage 10 is indicated as carrying a spare wing 11. The wing is supported or hung by means of three suspension mechanisms 12, two being located at the front and one at the rear. The details of each of the suspension mechanisms may be seen in Figures 3, 4 and 5 of the drawings, each of the suspension mechanisms preferably being substantially identical.

Each suspension mechanism 12 is connected by a pair of hollow struts 13 to the airplane fuselage 10. The two struts are bolted or otherwise fastened at their lower ends to a plate 14. To the plate 14 is permanently attached, such as by welding, a U-shaped member 15 having a pair of downwardly projecting blocks 16 and 17 welded thereto. Each of the blocks 16 and 17 carry a pair of aligned bores 18 and 19, respectively, in which is inserted a releasing pin 20. Each of the pins 20 has an expanded head portion 21 which is adapted to rest against a shoulder defining an enlarged portion of the bore 18. The pin 20 is held in place by means of a rupturable wire or cotter pin 22. From this construction, it will be seen that the elements 16 and 17 together form a bearing block for pins 20.

The shanks of the pins 20, between the blocks 16 and 17, engage in opposed notches in a notched block 23. The latter is held between the arms of a bifurcated member 24 by means of a pin 25. The bifurcated member may be attached directly to the spare wing 11 or through a second bifurcated member 26, as shown.

The bores 19 are provided with enlarged threaded portions 27 for the insertion of a pair of explosive cartridges indicated generally at 28. These cartridges are provided with threaded ends for mating with the threaded bore portions 27, and are removable and renewable.

From the above description and drawings, it will be seen that explosion of the charges in the cartridges 28 will cause the pins 20 to be driven out of the through bores 18 and 19, rupturing the lock wire 22 in the process. When this occurs, the notched block 23 and bifurcated member 24 fall away from the structure, releasing the wing 11, as will be seen hereafter. By reason of the notched structure of the block 23, it will be apparent that release will be accomplished even though only one of the pins 20 is driven out by its associated cartridge. There is thus provided a safety feature which insures instant and positive action of the releasing mechanism whenever the explosive charge is detonated.

The explosive cartridge 28 is of the type which can be exploded electrically, as is well known in the art. The explosive charge 29 is contained in a bore in the cartridge, with a detonating element 30 connected by conducting wires 31 and 32 to an actuating mechanism, as described hereafter. The explosive charge 29 should be of sufficient strength to rupture the lock wire 22 and eject the pins 20, without rupturing the walls of the cartridge 28. The conducting wires 31 and 32 are preferably led through the hollow interior of struts 13.

Referring now to Figure 6, the detonating elements 30 of the three suspension mechanisms 12 may be connected in series, with the two elements 30 for each mechanism 12 connected in parallel, as shown. This will insure that at least one element 30 in each mechanism will be actuated, so that all releasable blocks 22 are released simultaneously. Actuation is accomplished by closure of a switch 33, convenient to the pilot's station.

The above description has been with reference to a specific embodiment of the invention. It is to be understood, however, that the invention is not to be limited except as defined in the appended claims.

I claim:

1. A supporting and releasing mechanism, comprising a member adapted for connection to a supporting structure, a pair of releasable pins passing through bores in said member, rupturable means holding said pins in place, a notched member adapted for attachment to a supported article, a pair of opposed notches in said last named member engaging said pins, and separate explosive means associated with each said pin and arranged upon detonation thereof to drive said pin from engagement with said notched member and rupture said rupturable means, whereby to release said supported article from said supporting structure.

2. A supporting and releasing mechanism, comprising a member adapted for connection to a supporting structure, spaced projections on said member, a pair of releasable pins, each pair passing through said spaced projections of said member, rupturable means holding said pins in place, a notched member adapted for attachment to a supported article, a pair of opposed notches in said notched member engaging said pins between said projections, separate explosive means associated with each said pin and arranged upon detonation thereof to drive said pin from engagement with said notched member and rupture said rupturable means, and electrical means for simultaneously detonating all said explosive means, whereby to release said supported article from said supporting structure.

3. A supporting and releasing mechanism, comprising a plurality of members adapted for attachment to a supporting structure at a plurality of spaced points, spaced projections on each said member, a plurality of pairs of releasable pins, each pair passing through said opposed projections of a said member, rupturable means holding said pins in place, a plurality of notched members adapted for attachment to a supported article, a pair of opposed notches in each said last named members engaging a pair of said pins, separate explosive means associated with each said pin and arranged upon detonation thereof to drive its associated pin from engagement with said notched member and rupture said rupturable means, and electrical means for simultaneously detonating all said explosive means, whereby to release said supported article from said supporting structure.

4. A supporting and releasing mechanism, comprising supporting and supported parts, one part having spaced openings each slidably receiving a pin element, a member connected to the other part and disposed between said pin elements, said member having opposed recesses engaging said elements to provide a supporting connection, and separate explosive means associated with each element for displacing it axially of the opening from engagement with said member, such displacement of either element allowing escape of said member from the remaining element.

WARREN L. SPIELMAN.

REFERENCES CITED

The following references are of record in the file of this patent:

UNITED STATES PATENTS

| Number | Name | Date |
|---|---|---|
| 1,843,054 | Weinstein | Jan. 26, 1932 |
| 2,161,082 | Ovtschinnikoff | June 6, 1939 |
| 2,321,640 | Adkins | June 15, 1943 |
| 2,371,004 | Unterman | Mar. 6, 1945 |

FOREIGN PATENTS

| Number | Country | Date |
|---|---|---|
| 1,232 | Netherlands | Mar. 22, 1916 |
| 319,835 | Germany | Mar. 30, 1920 |